United States Patent [19]

Nadal

[11] 4,037,483

[45] July 26, 1977

[54] WINDOW OPERATOR MECHANISM

[76] Inventor: Nestor M. Nadal, Ci 37 Calle Pedro Goyco, Levittown Lakes, P.R. 00950

[21] Appl. No.: 680,145

[22] Filed: Apr. 26, 1976

[51] Int. Cl.² ............................................ F16H 19/08
[52] U.S. Cl. .................................. 74/32; 74/DIG. 10
[58] Field of Search ................ 74/32, 35, 63, DIG. 10

[56] References Cited

U.S. PATENT DOCUMENTS

| | | | |
|---|---|---|---|
| 3,103,800 | 9/1963 | Kantar | 74/DIG. 10 |
| 3,361,004 | 1/1968 | Williams et al. | 74/DIG. 10 |

OTHER PUBLICATIONS

"Plastics in the Automotive Industries, Part I-Nylon," by Norman M. Lloyd, Automotive Industries, Apr. 1, 1961, vol. 124 No. 7.

*Primary Examiner*—Edgar W. Geoghegan
*Attorney, Agent, or Firm*—Roylance, Abrams, Berdo & Kaul

[57] ABSTRACT

An operator for hinged windows in which all components are molded from polymeric material. The worm gear, sector gear and link are molded glass-filled nylon and the housing, crank and other components are molded ABS. The worm gear tooth has a top land to root axial dimension ratio of 4:10 and each face of the tooth is inclined at a 20° angle. The sector gear has a pitch diameter to thickness ratio of 5:1. The link is provided with a stiffening rib.

6 Claims, 7 Drawing Figures

WINDOW OPERATOR MECHANISM

This invention relates to closure operators and, specifically, to a window operator of the type normally employed with "casement" type hinged window closures.

BACKGROUND OF THE INVENTION

Casement or hinged window closures have become very common in recent years, largely supplanting double-hung or other sliding type closures for window openings, particularly in apartments but also in many private homes. In these windows a frame is fixedly mounted in the opening and a separate frame, carrying the glass window, is hingedly connected to the fixed frame.

In order to provide a device for opening and closing the hinged portion a crank-operated device is mounted on the fixed frame with a link passing through a relatively small opening in the fixed frame, the link comprising a flat bar pivotally connected at one end to the movable frame and at the other end to an arm of the device. The arm is normally formed on a sector gear, the teeth of which engage a worm gear, the sector and worm gears being rotatably disposed within a relatively flat housing mounted on the fixed frame.

A manually operated crank is provided on the housing and coupled to the worm gear so that rotation of the crank rotates the worm gear which, in turn, rotates the sector gear, moving the arm and link to open or close the window.

Window operators of this type have conventionally been produced using metallic materials, commonly zinc or similar alloys, for reasons of cost and strength, and because such alloys resist corrosion and other detrimental environmental effects. Production of these relatively simple devices is, however, rather expensive because of the need to machine the worm gear thread or tooth and the sector gear teeth. In addition it is very expensive to assemble the metal operators because of the multiple steps and machine operations necessary. In particular, the connection of the operating link to the sector gear arm requires deformation of a metal stud or fastener. The knob must be pinned or riveted to the worm shaft and the sector gear axle must be fastened to the housing by a rivet technique.

There has been a desire to produce window operators for this purpose, particularly as replacement devices but also for new construction using "plastic" materials, particularly polymeric materials because this would permit components such as the sector and worm gears to be molded rather than machined or forged, thereby greatly reducing the cost of manufacture. Broken parts could also be replaced in the field. However, problems of strength of the polymeric materials has prevented the successful manufacture thereof. In this context it will be recognized that the mechanical forces involved are rather large. As will be apparent from the more detailed discussion hereinafter, if the window tends to stick or in any way to resist motion, the worm and sector gear, being rather small components, are subjected to large forces which tend to destroy those components if they are simply made from the polymeric materials rather than metal, using substantially the same design criteria.

It is, of course, not feasible to change the basic design of window operators of this type and for this general purpose, particularly if they are to be used to replace worn-out operators of conventional design. Thus, the spacing of the openings to attach the operator housing to the fixed frame must be the same; the housing must fit in the same location, usually with very small clearance, adjacent the frame and sill; the arm and link must pass through the same opening in the frame and operate the window in essentially the same fashion; and the housing and crank should present substantially the same appearance as to shape for functional as well a customer acceptance reasons.

BRIEF SUMMARY OF THE INVENTION

An object of the present invention is to provide an improved window operator for hinged windows in which the components can be molded from polymeric material and in which the molded components are designed to have good strength and structural integrity, but wherein the design of the operator departs as little as possible from the design and operating characteristics of a conventional operator of similar type manufactured from metal.

A further object is to provide a crank-operated window operator of molded polymeric material which can be used as a direct replacement device and which can be manufactured at greatly reduced cost in the order of 25% of the cost of a metal operator of similar type.

Briefly described, the invention comprises an improved window operator in which each of the components is molded from a polymeric material, the operator being of the type having a housing having a central longitudinal plane, a worm gear rotatably mounted in said housing with the axis of rotation of said worm gear intersecting said plane at an acute angle, a crank handle coupled to said worm gear outside of said housing, a sector gear rotatably mounted in a plane parallel with said central plane with its teeth in engagement with said worm gear to be driven thereby, an arm formed on said sector gear and extending out of said housing, and a link pivotally attached to said arm, said link being connectable to a window closure to operate said closure upon rotation of said crank, the improvement wherein the worm gear is formed with a single helical tooth in the major portion of which the ratio of the axial dimension of the top land to the axial dimension of the root is substantially 4:10. The sector gear is formed with a ratio of pitch diameter to thickness of about 5:1. Each major face of the tooth of the worm gear is inclined relative to a plane perpendicular to the axis of rotation of the worm gear by an angle of substantially 20°. The worm gear, sector gear and link are injection molded from a polymeric material consisting essentially of glass-filled nylon including about 30% glass, by weight.

In order that the manner in which the foregoing and other objects are attained in accordance with the invention can be understood in detail, a particularly advantageous embodiment thereof will be described with reference to the accompanying drawings, which form a part of this specification, and wherein.

Figure 1:
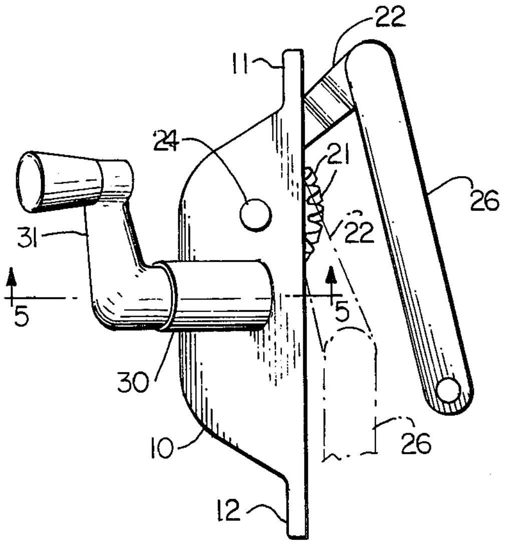
FIG. 1 is a plan view of a window operator according to the invention.
Figure 2:
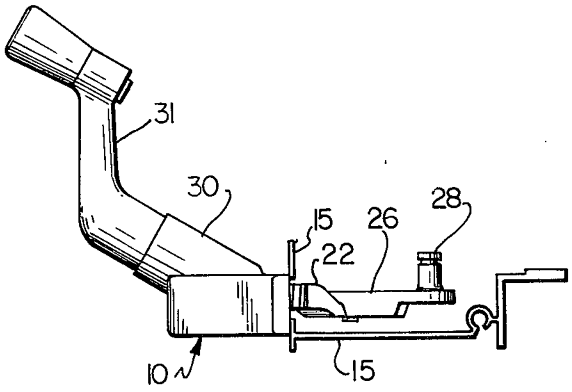
FIG. 2 is an end elevation of the operator of FIG. 1.
Figure 6:
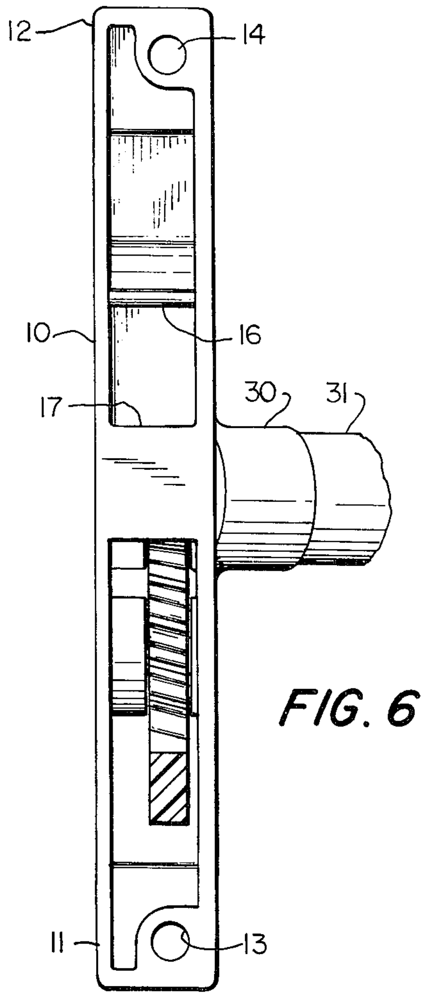
FIG. 6 is a partial side elevation of the apparatus of FIG. 1.
Figure 7:
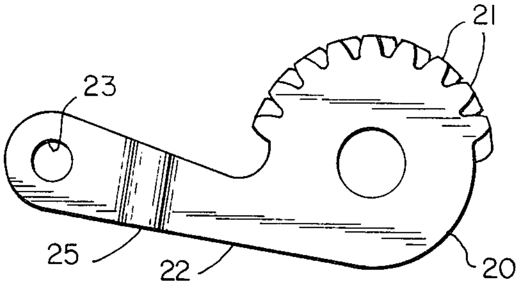
FIG. 7 is a plan view showing the sector gear and arm of the apparatus of FIGS. 1 and 2.

As seen in FIGS. 1, 2 and 6, the apparatus includes a housing 10 which is elongated and flat and which is substantially hollow, the housing having ears 11 and 12 extending outwardly at opposite ends thereof, the ears having openings 13 and 14 through which fastening devices, such as bolts or machine screws, can be passed to fasten the device to a window frame. A typical window frame configuration is illustrated schematically at 15 in FIG. 2 to indicate the frame to which the device can be fixedly attached.

As seen in FIG. 6, the housing can include a stiffening member 16 in the hollow portion at one end of a central thickened portion 17 which constitutes the housing for a worm gear, in addition to being stiffened for the housing itself. The housing can conveniently be injection molded using acrylonitrile butadiene styrene (ABS) in a single step.

A sector gear 20 having a plurality of helical teeth 21 molded on about 180° of the periphery of the gear can be molded from glass-filled nylon, using about 30% glass. Nine such teeth are sufficient. An operating arm 22 is integrally formed on gear 20 and has an opening 23 near the distal end thereof. Gear 20 is mounted on an axle 24 which passes through openings in housing 10 to permit the gear to be rotatable about an axis defined by the central axis of axle 24.

Arm 22 can be provided with an offset indicated at 25 so that two portions of the arm lie in different, but parallel, planes.

Figure 3:
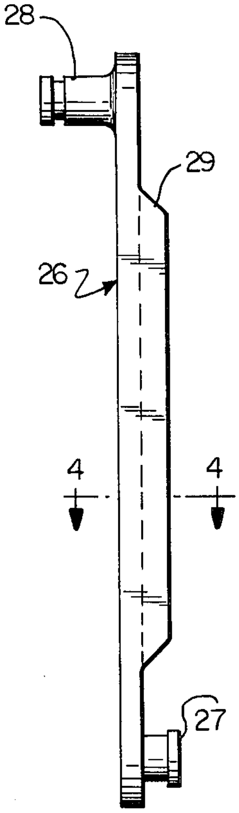
FIG. 3 is a side elevation of a link usable in the apparatus of FIG. 1.
Figure 4:
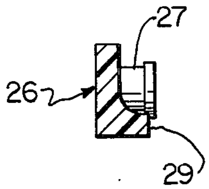
FIG. 4 is a section along lines 4—4 of FIG. 3.

A link 26, shown in detail in FIG. 3 is provided with a stud 27 at one end thereof, the stud having a slightly enlarged head insertable through opening 23 in arm 25 so that the link is freely pivotable about the stud. At the opposite end of link 26, and on the opposite side thereof, is a stud 28, also having a slightly enlarged head, which is insertable through an opening in a bracket attached to the hinged portion of a casement window to operate the window. A grove is provided in stud 28 to receive a locking ring. A stiffening rib 29 is formed along one edge of link 26, the rib being seen in section in FIG. 4. The purpose of stiffening rib 29 is to prevent flexing of the link under compressive stress. As previously indicated, link 26, the studs thereon and rib 29 are integrally injection molded, using substantially the same glass-filled nylon composition employed for sector gear 20.

At the top of housing 10 there is a generally cylindrical bushing 30 which extends away from the housing at an angle of approximately 30° with respect to the central horizontal plane of the housing. A crank handle 31 of conventional design, but formed from plastic, is slightly recessed into the end of housing 30 and is rotatable with respect thereto.

Housing 30 contains the worm gear which meshes with the sector gear within housing 10 to drive arm 22 and link 26. The worm gear 32 is more clearly shown in FIG. 5. The gear itself comprises a generally cylindrical body 33 with a single helical thread or tooth 34 formed thereon, the tooth being of uniform shape throughout except for the ends which taper to points in conventional fashion. At the lower end the cylindrical body protrudes beyond the thread to provide a journal portion which fits into a recess 35 in housing 10. At its upper end the body is provided with an integrally formed radially outwardly extending flange 36 which rides against the interior surface of portion 30 and maintains the threaded member properly aligned. An annular retaining collar 37 having a radially outwardly extending flange 38 is inserted into the open end of portion 30 and abuts the outwardly facing surface of flange 36, retaining the worm gear structure in place against axial movement. The inward extent of movement of member 37 is determined by the abutment of flange 38 with a shoulder 39 formed in member 30. Retaining member 37 is held in place by a suitable adhesive of conventional type, or by ultra-sonic welding.

A protruding crank-engaging portion 40 which is integrally formed with the worm gear structure protrudes axially from the end thereof and is received within an inwardly extending recess 41 in the end of crank member 31. Portion 40 is square or rectangular in cross-section to prevent relative rotation between the crank and the worm gear. The crank frictionally engages portion 40 and, if desired, can be adhered thereto.

The details of thread 34 are of considerable significance in this instructure because the thread is designed so that the stresses thereon, particularly the shear stresses, do not exceed the strength capabilities of the glass-filled nylon from which it is made. In a typical window operator designed to function as a replacement or to be equivalent in size to operators conventionally used, the following dimensions are appropriate:

| WORM GEAR DATA | Inches | mm |
|---|---|---|
| Worm Thread Outside Diameter | .5625 | 14.29 |
| Pitch Diameter | .4375 | 11.11 |
| Root Diameter | .3125 | 7.94 |
| Lead | .1963 | 4.98 |
| Addendum | .0625 | 1.59 |
| Whole Depth | .1250 | 3.175 |
| Axial Dimension of Top Land (a) | .056 | 1.4224 |
| Axial Dimension of Root (b) | .140 | 3.556 |
| Helix Angle about 24° | | |
| Pitch (Transverse) | .1963 axial | 4.98 |
| Pressure Angle - 20° | | |

Figure 5:
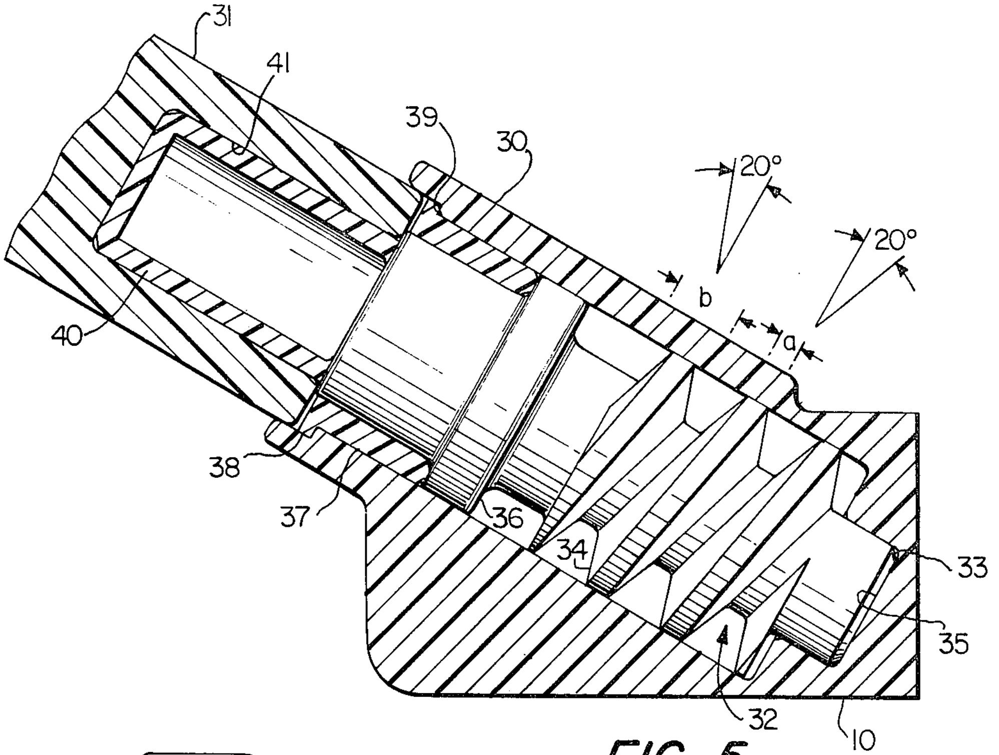
FIG. 5 is an end elevation, in section, of a portion of the operator of FIG. 1.

In addition, as indicated in FIG. 5, each face of the thread, that portion lying between the root and top land of the thread, is formed so that it makes an angle, in a plane passing through the axis of rotation of the worm gear, 20° relative to a plane perpendicular to the central axis of the worm as shown in FIG. 5, or of about 70° with the outer cylindrical surface of the body of the gear or, stated differently, with a line parallel to the axis of rotation. This can be stated to be in terms of pressure angle of 20° which, in conjunction with the appropriately designed sector gear, transmits the necessary forces from crank 31 without damage to the teeth of either gear. Even in the absence of lubrication, binding of the threads is absent.

Following are the dimensions for a sector gear usable with a worm gear having the above characteristics:

| SEECTOR GEAR DATA | Inches | mm |
|---|---|---|
| Outside Diameter | 1.350 | 34.29 |
| Pitch Diameter | 1.250 | 31.75 |
| Root Diameter | 1.1146 | 28.31 |
| Pitch | .1963 circular | 4.98 |
| Lead | .1963 | 4.98 |
| Addendum | .0500 | 1.27 |
| Whole Depth | .117 | 2.97 |
| Helix Angle - 22° | | |
| No. of Teeth - 9 | | |

While the above dimensions are not, in themselves, critical in that the entire structure can be manufactured in a larger or smaller form, the relationships between dimensions are extremely important. In particular, the ratio of 4:10 between the top land axial dimension, dimension *a* in FIG. 5, and the root axial dimension of the majority of the worm tooth, dimension *b* in FIG. 5, except at its ends, is critical, along with the face angle of 20°, because of the shear stresses imposed on the tooth. In addition, it will be observed that the sector gear is about twice the thickness of a normal sector gear of similar diameter to provide adequate strength.

The assembly of the structure described herein is extremely simple and accounts, in part, for the cost reduction resulting from molded manufacture of this device from polymeric materials. Once the parts have been molded, the sector gear and its axle are inserted into the housing and the axle is press to fit into the housing to keep it in place. The worm gear is then inserted into bushing 30, turning it to engage the sector gear, and collar 37, is inserted and held in place by solvent cementing or ultra-sonic welding. The handle snap-fits onto square end 40 of the worm gear. Stud 27 of link 26 is then snapped through opening 23 of arm 22 (instead of the multiple steps required in assembling the metal operator) completing the assembly.

While one advantageous embodiment has been chosen to illustrate the invention, it will be understood by those skilled in the art that various changes and modifications can be made therein without departing from the scope of the invention as defined in the appended claims.

What is claimed is:

1. An improved window operator in which each of the components is molded from a polymeric material, the operator being of the type having a housing having a central longitudinal plane, a worm gear rotatably mounted in said housing with the axis of rotation of said worm gear intersecting said plane at an acute angle, a crank handle coupled to said worm gear outside of said housing, a sector gear rotatably mounted in a plane parallel with said central plane with its teeth in engagement with said worm gear to be driven thereby, an arm formed on said sector gear and extending out of said housing, and a link pivotally attached to said arm, said link being connectable to a window closure to operate said closure upon rotation of said crank, the improvement wherein said worm gear is formed with a single helical tooth in the major portion of which the ratio of the axial dimension of the top land to the axial dimension of the root is substantially 4:10.

2. An operator according to claim 1 wherein each major face of said tooth of said worm gear is inclined relative to a plane perpendicular to the axis of rotation of said worm gear by an angle of substantially 20°.

3. An operator according to claim 2 wherein said worm gear is injection-molded from a polymeric material consisting essentially of glass-filled nylon including about 30% glass, by volume.

4. An operator according to claim 1 wherein said link comprises a substantially flat, straight bar having a perpendicular strengthening rib extending along one edge thereof.

5. An operator according to claim 4 wherein said worm gear, said sector gear and said link are injection-molded from a polymeric material consisting essentially of glass-filled nylon including about 30% glass, by volume.

6. An operator according to claim 1 wherein said sector gear is formed with a ratio of pitch diameter to thickness of about 5:1.

* * * * *